(No Model.)

G. VALLEY.
SPRING SPOKE WHEEL.

No. 513,848. Patented Jan. 30, 1894.

WITNESSES:
J. A. Lynch,
C. C. Brown.

Gustaf Valley
INVENTOR

ATTORNEY Geo. W. King

UNITED STATES PATENT OFFICE.

GUSTAF VALLEY, OF CLEVELAND, OHIO.

SPRING-SPOKE WHEEL.

SPECIFICATION forming part of Letters Patent No. 513,848, dated January 30, 1894.

Application filed May 15, 1893. Serial No. 474,477. (No model.)

*To all whom it may concern:*

Be it known that I, GUSTAF VALLEY, of Cleveland, in the county of Cuyahoga and State of Ohio, have invented certain new and useful Improvements in Spring-Spoke Wheels; and I do hereby declare the following to be a full, clear, and exact description of the invention, such as will enable others skilled in the art to which it pertains to make and use the same.

My invention relates to an improved wheel the same having flat spring metal spokes arranged in pairs, so that either pair of spokes can be removed from and returned to the wheel, without disturbing any other members of the wheel.

I have chosen to illustrate my invention, as applied to the street car wheel.

Figure 1:
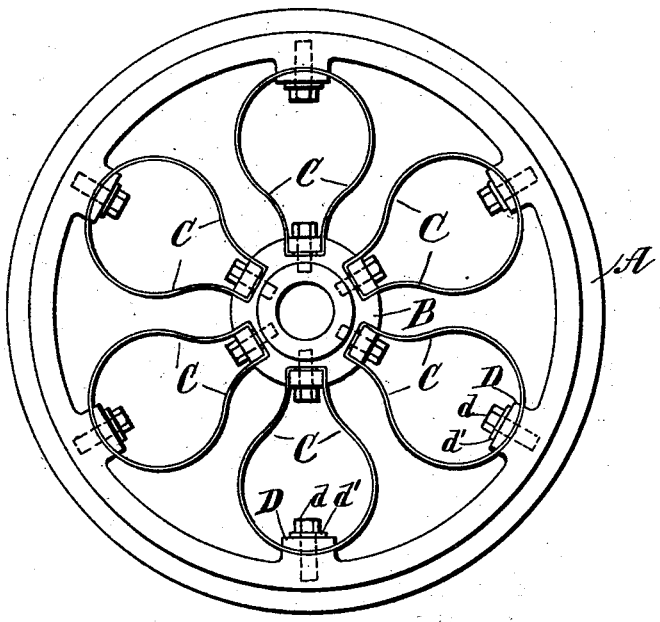
Figure 2:
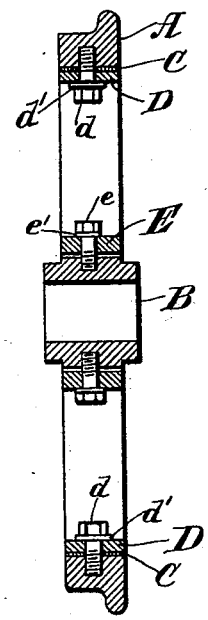

In the accompanying drawings, Figure 1 is a side elevation of a wheel embodying my invention. Fig. 2 is an elevation in transverse central section of the same.

A represents the rim of the wheel, B the hub and C the spokes thereof. The spokes are arranged in pairs as shown in Fig. 1, a pair of spokes being constructed of a flat piece of spring metal, the same being bent approximately U shaped with the ends thereof bent toward each other as shown at c. The rim internally has a series of seats a curved to fit the central portion of the spring. There are provided blocks D that serve as washers the one face of a block being curved to fit the spring. Each block D is pierced to admit the passage of securing bolts d, these bolts being screwed into radial threaded holes in the rim of the wheel. Between the head of each bolt d and the opposing block D is inserted a spring washer d'. This washer comprises a small concave convex disk of spring metal with the convex side thereof next to the bolt head. In screwing the bolts home this spring washer is compressed and the recoil thereof insures a constant pressure as between the bolt head and the opposing block D whereby they are firmly held in place.

Between the inner ends of a pair of spokes is fitted a block E, this block engaging the offset ends or feet c of the spokes. The hub has a recess b for each pair of spokes and each block E is pierced to accommodate a securing bolt e, these bolts e being screwed into threaded holes extending radially into the hub. Between the head of each bolt e and the opposing block E is inserted a spring washer e' of the variety already described. These spring washers are so simple and so well known that it is not considered necessary to illustrate them in detail in the drawings.

With the construction shown it is evident that by removing the two securing bolts, any pair of spokes can be removed from the wheel and a new pair of spokes can be inserted, if need be, without disturbing the other members of the wheel.

A car wheel say thirty-six inches in diameter, and constructed according to my invention, the hub thereof will yield an inch or more under a heavy blow delivered on the rim of the wheel, as would be the case as running over uneven joints in the rails or in passing frog switches, &c., and such yielding of the hub is a great relief to the motor and other parts of the machinery of the car.

What I claim is—

1. A wheel consisting of a rim provided with curved seats upon its inner periphery, flat spring metal spokes substantially U-shaped, a recessed hub, and securing-blocks and bolts adapted to detachably secure said spokes to the curved seats and hub, substantially as described.

2. A metal wheel having flat spring metal spokes arranged in pairs, the piece of spring metal that constitutes a pair of spokes being bent approximately U shaped with the ends thereof turned toward each other, the center of each U engaging a corresponding seat on the inside of the rim, the other extremes of a pair of spokes engaging a corresponding recess or seat in the hub, with securing bolts, block and washers, arranged substantially as described and for the purpose set forth.

In testimony whereof I sign this specification, in the presence of two witnesses, this 13th day of May, 1893.

GUSTAF VALLEY.

Witnesses:
GARDNER P. NASH,
H. C. PITCHER.